(12) United States Patent
Petruska

(10) Patent No.: US 8,461,844 B2
(45) Date of Patent: Jun. 11, 2013

(54) SELF CHARGING ION SENSING COIL

(75) Inventor: David C. Petruska, Fort Collins, CO (US)

(73) Assignee: Woodward, Inc., Fort Collins, CO (US)

(*) Notice: Subject to any disclaimer, the term of this patent is extended or adjusted under 35 U.S.C. 154(b) by 386 days.

(21) Appl. No.: 12/896,370

(22) Filed: Oct. 1, 2010

(65) Prior Publication Data

US 2011/0080174 A1  Apr. 7, 2011

Related U.S. Application Data

(60) Provisional application No. 61/248,267, filed on Oct. 2, 2009.

(51) Int. Cl.
  *F02P 17/00* (2006.01)
(52) U.S. Cl.
  USPC ........... 324/399; 324/393; 324/402; 324/459; 324/464; 73/35.08; 73/114.08; 73/114.62
(58) Field of Classification Search
  USPC ............... 324/380, 391, 393, 399, 388, 459, 324/460, 462, 464; 73/35.08, 114.62, 114.63
  See application file for complete search history.

(56) References Cited

U.S. PATENT DOCUMENTS

| | | | |
|---|---|---|---|
| 5,197,448 A | 3/1993 | Porreca et al. | |
| 5,207,200 A | 5/1993 | Iwata | |
| 5,777,216 A | 7/1998 | Van Duyne et al. | |
| 5,866,808 A | 2/1999 | Ooyabu et al. | |
| 5,914,604 A * | 6/1999 | Bahr et al. | 324/399 |
| 6,000,276 A * | 12/1999 | Mogi et al. | 73/35.08 |
| 6,360,587 B1 | 3/2002 | Noel | |
| 6,781,384 B2 * | 8/2004 | Abdel-Rahman et al. | 324/464 |

FOREIGN PATENT DOCUMENTS

KR  1995-0009047 B1  8/1995

OTHER PUBLICATIONS

Linear Regulator, Jun. 2006, Wikipidea via Wayback Machine web.archive.org, p. 2.*
Delphi; "Powertrain Systems, Delphi Ionization Current Sensing Ignition Subsystem"; publication; 2009; 4 pages, pp. 1-4.

* cited by examiner

*Primary Examiner* — Patrick Assouad
*Assistant Examiner* — Alexander J Nemtzow
(74) *Attorney, Agent, or Firm* — Reinhart Boerner Van Deuren P.C.

(57) ABSTRACT

A self charging ion current sensing circuit is provided. The self charging ion current sensing circuit is coupled to spark generation circuitry, and utilizes the spark plug electrodes as the ion current sensing electrodes. The self charging is achieved by utilizing the spark current during an ignition event to charge an ion bias capacitor. After the ignition event, the charge voltage build up on the ion bias capacitor is used to provide an ion current across the spark plug gap. The ion current is passed through an offset stage that translates the ion current sense voltage to a voltage that can be buffered and amplified from a single power source available in automotive and vehicular applications. The output of the circuit provides tri-state information, including spark current, null current, and linear representation of ion sense current.

22 Claims, 3 Drawing Sheets

SELF CHARGING ION SENSING COIL

CROSS-REFERENCE TO RELATED PATENT APPLICATION

This patent application claims the benefit of U.S. Provisional Patent Application No. 61/248,267, filed Oct. 2, 2009, the entire teachings and disclosure of which are incorporated herein by reference thereto.

FIELD OF THE INVENTION

The present invention relates generally to ion current sensing in internal combustion engines, and more particularly to ion current sensing in internal combustion engines utilizing ignition spark plug electrodes to perform such sensing.

BACKGROUND OF THE INVENTION

In controlling an internal combustion, spark ignited engine, for example in an automotive or other transportation vehicle application, the Engine Control Unit (ECU) monitors various parameters of the ignition and combustion events to optimize performance and minimize emissions created thereby. It has long been known that during the combustion event, the ionization produced in the cylinder or combustion chamber is capable of conducting electricity. As such, ion current sensors have been employed to provide the ECU with needed information regarding the initiation of the ignition as well as the quality and duration of the combustion event.

While the information provided by an ion current sensor is invaluable to an ECU in controlling the engine's performance, the requirement for the addition of a separate sensor and associated circuitry is cost prohibitive, particularly in the cost sensitive automotive market. In an attempt to reduce the overall cost and the attendant reduction in reliability that the addition of an extra sensor brings with it, engine control engineers have developed circuitry that allows sensing of the ion current utilizing electrodes of the spark plug that is already included to initiate the ignition event.

The ignition and ion sensing technology realized by these embodiments may also be used in diesel exhaust particulate filter regeneration. These systems utilize an active burner system that regenerates or burns the carbon build up in a diesel particulate filter (DPF) located in the exhaust of a diesel engine. One such system senses the pressure drop across the DPF. As the DPF collects diesel particulate carbon particles, the pressure drop across the filter increases. When the DPF pressure drop exceeds a predetermined threshold, the active burner system injects air and fuel into the engine's exhaust path up stream of the DPF and a spark plug driven by an ignition coil ignites the mixture. This creates a constant and controlled flame that is used to burn the carbon build up in the DPF (regeneration of filter).

The ion sensing feature is useful in detecting the presence of a flame in such DPF regeneration systems. It is dangerous to flow unburned fuel into the exhaust system if it is not being burned as intended because excessive levels of unburned fuel can collect and create an explosion hazard. Ion sensing provides a nearly instantaneous feedback on the status of the flame in the active burner system to ensure that the fuel being injected is burning as intended. Competitive technology is a thermocouple to sense the presence of flame, but the response time of the thermocouple is significantly slower than the ion sensing.

While such ion sensing systems provide extremely useful information for both reciprocating engines, so that the ECU may detect such conditions as engine misfire, combustion duration, engine knocking, approximate air/fuel ratio, indication of spark plug fowling, pre-ignition, etc., and continuous flame burners, so that the regeneration system can immediately detect the presence of flame, such systems typically require a second energy source to apply the voltage necessary to generate the ionization current. These systems also require a sensitive detection circuit for measuring the micro-amp ionization current, a signal which is particularly susceptible to electromagnetic interference (EMI) and other electrical noise related issues common in an engine environment. While the information obtained is quite valuable, the costs, complexity, and reduction and reliability resulting from the addition of such circuitry are extremely disadvantageous in most applications, and in particular in the cost sensitive automotive market.

It is desirable, therefore, for an ionization current detection circuit that does not require a separate high power voltage source or a micro-amp detection circuit. Embodiments of the present invention provide such circuitry.

BRIEF SUMMARY OF THE INVENTION

Embodiments of the present invention provide a new and improved ion current sensing circuit for use in internal combustion engines, particularly in the automotive and transportation industries. More particularly, embodiments of the present invention provide a new and improved ion current sensing circuit that does not require a separate high voltage power supply. Still more particularly, embodiments of the present invention provide a new and improved ion current sensing circuit that does not require a separate high voltage power supply or a micro-amp sensing circuit.

In one embodiment of the present invention, a self charging ion sensing circuit provides a tri-state output that enables the detection of a null condition, a sparking event, and a linear representation of the magnitude of the ion current detected thereby. In one embodiment the circuitry provides a zero to five volt output. In such an embodiment, the output will be approximately zero volts during a sparking event, approximately one volt when there is no ion current and no sparking event, and will vary from between approximately one to approximately five volts in proportion to the magnitude of an ion current sensed thereby. The ion sensing electrodes are those of the spark plug.

In one embodiment, the self charging of the ion current sensing circuitry is achieved by allowing the spark current during a sparking event to charge a series connected ion bias capacitor during the normal ignition event. Such ignition events may be an inductive event, a capacitive discharge event, or an alternating current event. After the ignition event, the charge voltage built up on the series connected ion bias capacitor is used to provide an ion current across the spark plug gap. The polarity of the ion bias voltage is opposite to the polarity of the spark breakdown voltage during the ignition event.

In one embodiment, the zero to five volt output signal is created by using a buffering and amplifying operational amplifier as powered from a single, low current, five volt power source. The input to this buffering and amplifying circuitry includes an offset stage that translates the ion current from a below ground signal to a voltage that can be buffered and amplified from a single power source of a voltage commonly available in automotive and other vehicular applications. As such, the circuitry can differentiate between "positive" ion current, "negative" spark current, and null current with a single power source, and generate an output varying between zero and five volts.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
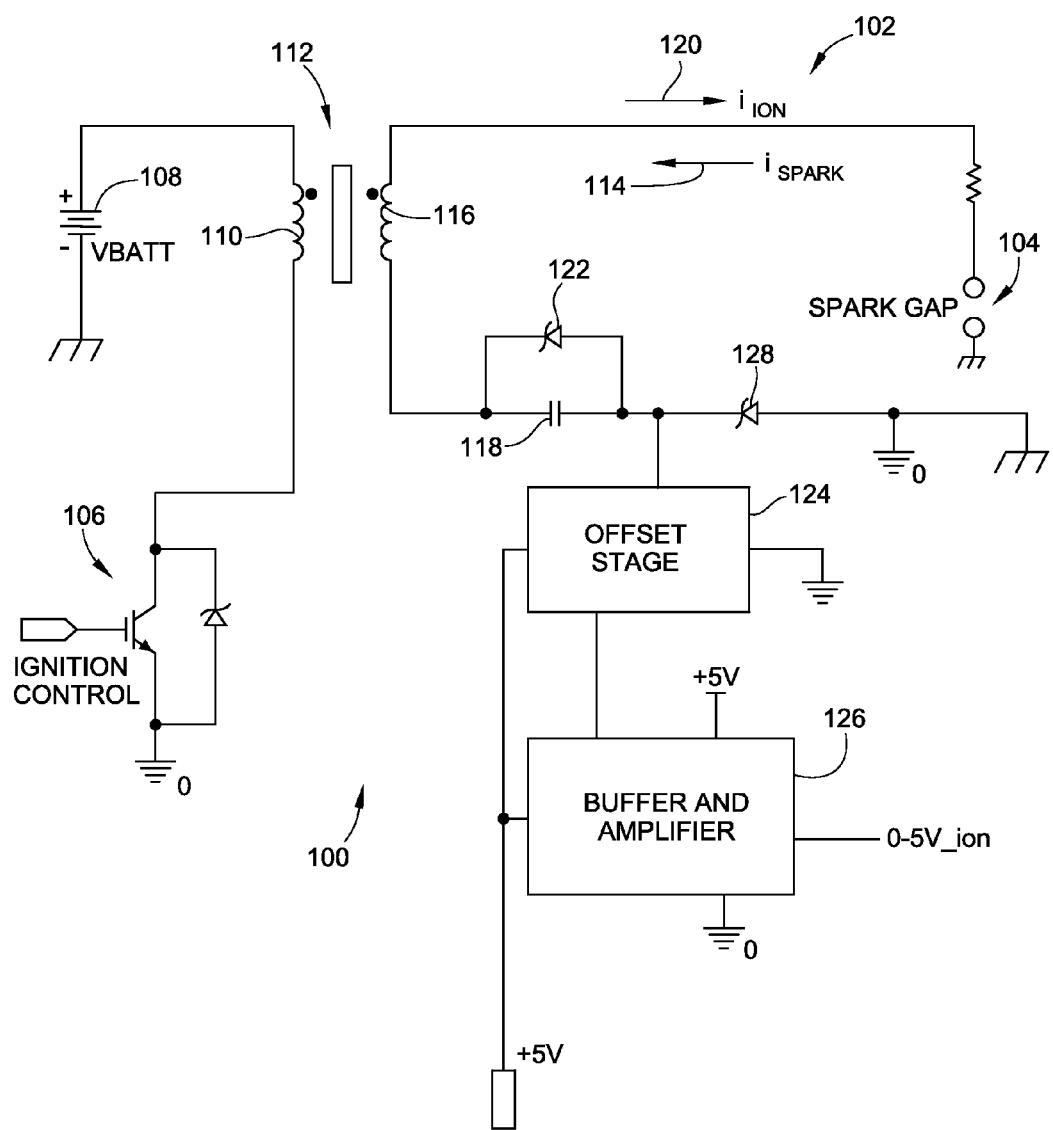
FIG. 1 is a simplified single line schematic block diagram of one embodiment of a self charging ion sensing circuit constructed in accordance with the teachings of the present invention.

Turning now to the drawings, there is illustrated in FIG. 1 an exemplary embodiment of a self charging ion sensing circuit 100 that finds particular applicability to automotive and other transportation vehicle engine control systems. However, while the following discussion will present various embodiments and operating environments in which these embodiments find particular applicability, the invention is not so limited. As such, these exemplary embodiments and operating environments should be taken by way of example only, and not by way of limitation.

As shown in FIG. 1, the self charging ion current sensing circuit 100 interfaces with an engine spark control circuit 102 that is capable of generating an ignition spark across a spark gap 104 of a spark plug. As shown in FIG. 1, the spark generation circuit 102 is an inductive circuit whereby an ignition control circuit 106 controls current flow from a battery 108 across the primary winding 110 of transformer 112. Once triggered by the ignition control circuit 106, a spark is generated across spark gap 104 resulting in current flow in the direction indicated by arrow 114 from the spark gap 104 and through the secondary winding 116 of transformer 112.

The self charging ion sensing circuit 100 utilizes the spark current flow to charge a series connected ion bias capacitor 118 that will be used to provide an ion bias voltage of opposite polarity to the spark breakdown voltage to sense ion current flow as indicated by arrow 120 after the ignition event.

Specifically, the self charging of the ion bias capacitor 118 occurs during a cathode spark event. A cathode spark event creates a negative breakdown voltage at the spark gap 104 and then flows through the secondary winding 116 and ion bias capacitor 118. This results in a positive charge across capacitor 118. If the voltage on capacitor 118 attempts to increase beyond the Zener voltage value of Zener diode 122, the voltage on capacitor 118 will be limited to the Zener voltage of the Zener diode 122. Indeed, Zener diode 122 determines the charge voltage on the capacitor 118 and prevents the voltage on capacitor 118 from getting excessively large during the flow of spark current during the ignition event.

After the cathode spark event, an anode ion sense event can occur. Specifically, the current flows in the opposite direction as during the spark event as may be seen through a comparison of arrows 114 and 120. This ion current is processed through an offset stage 124 that includes a current shunt resistance that converts the ion current to a voltage. This sensed ion voltage is then offset from a negative voltage to a positive voltage in such a manner that is can be buffered and amplified by buffer and amplifier circuitry 126 that is powered from a single power supply, e.g. by an operational amplifier. The output of the buffer and amplifier circuitry 126 in the embodiment illustrated in FIG. 1 is a voltage that ranges between approximately zero and five volts.

Specifically, when there is no ion or spark current flowing in circuit 102, the output of the buffer and amplifier circuitry 126 is approximately one volt. When there is cathode spark current 114 flowing in circuit 102, the output of the buffer and amplifier circuitry 126 is approximately zero volts. However, when there is anode ion current 120 flowing, the output of the buffer and amplifier circuitry 126 will be between approximately one volt and five volts in proportion to the magnitude of the ion current 120.

Zener diode 128 conducts the cathode spark current 114 during the spark event. Since the spark current is excessively high relative to the impedance of the offset stage 124, it requires a higher current shunt path. In one embodiment, a 6.2 volt, five watt Zener is used as the ion Zener diode 128.

Figure 2:
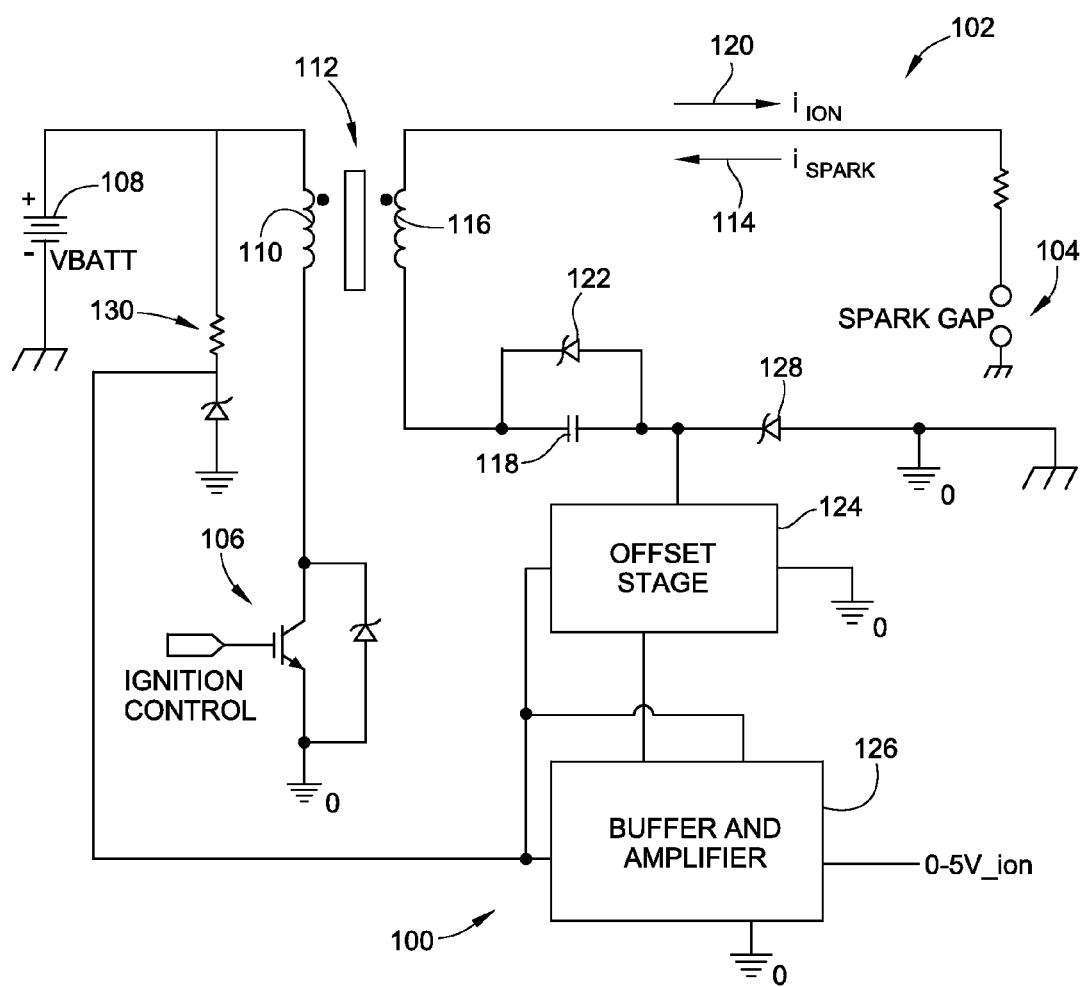
FIG. 2 is a simplified single line schematic block diagram of an alternate embodiment of a self charging ion sensing circuit constructed in accordance with the teachings of the present invention.

In the embodiment illustrated in FIG. 2, operation of the self charging ion current sense circuitry 100 and the spark generation circuitry 102 is similar to that of FIG. 1, but the embodiment of FIG. 2 does not require a separate five volt power supply as used in the embodiment of FIG. 1. It should be noted that the use of a five volt power supply is acceptable in the embodiment of FIG. 1 since such power is readily available in most automotive and transportation vehicle applications, and therefore does not add excessive cost to the implementation of such circuitry. However, in the embodiment illustrated in FIG. 2, an internal voltage regulation circuit 130 is included to power both the offset stage 124 and the buffer and amplifier circuitry 126. As may be seen, no external five volt supply is needed since the voltage regulation circuitry 130 provides the power to these circuits.

Figure 3:
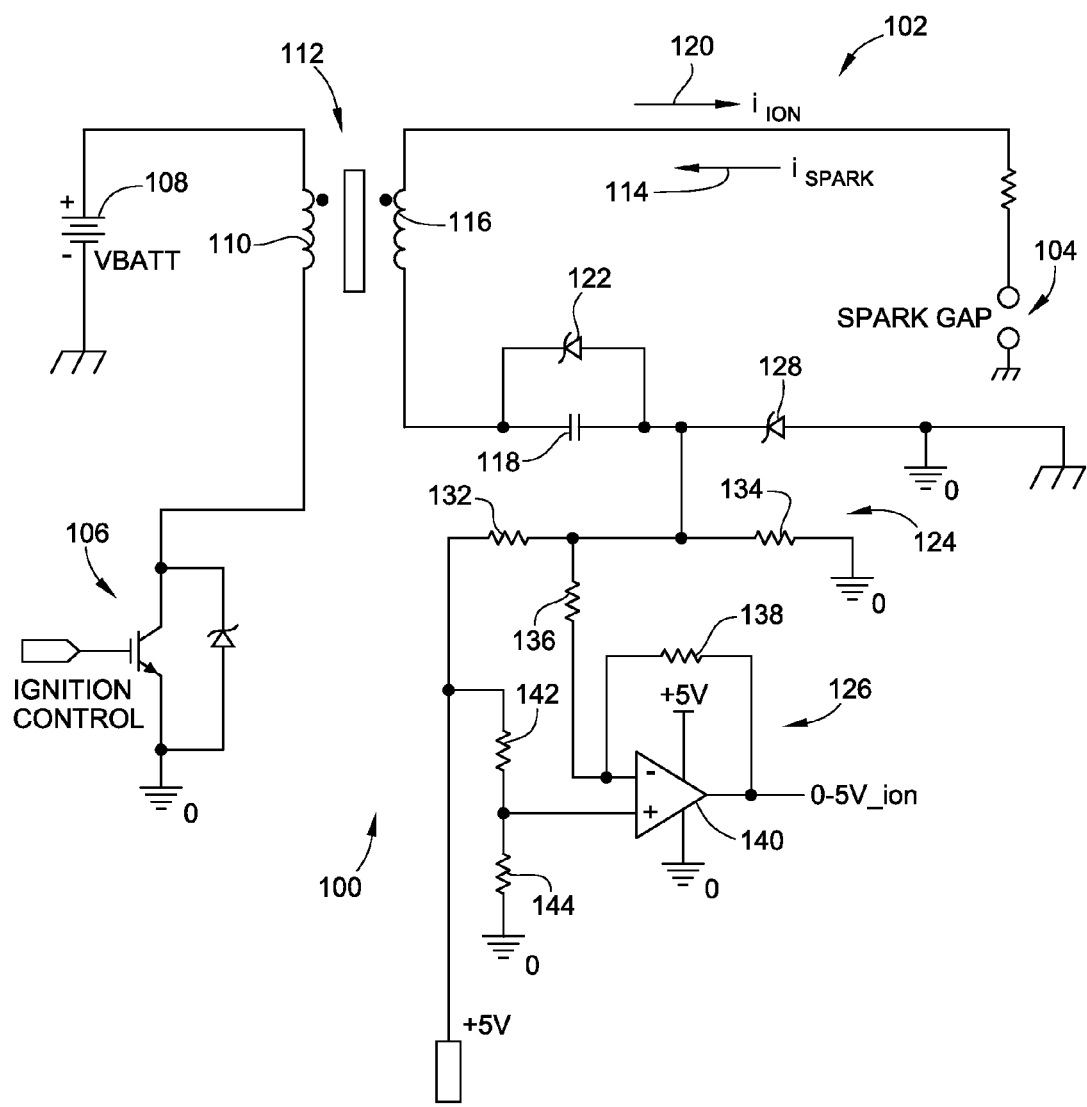
FIG. 3 is a simplified single line schematic block diagram of one embodiment of a self charging ion sensing circuit constructed in accordance with the teachings of the present invention.

FIG. 3 illustrates one embodiment of circuitry for the offset stage 124 and the buffer and amplifier circuitry 126. In this embodiment, the offset stage 124 includes resistors 132, 134. The buffer and amplifier circuitry 126 includes an inverting input resistor 136 and feedback resistor 138 for the operational amplifier 140. The non-inverting input of operational amplifier 140 is coupled to the voltage divider network of resistors 142, 144.

When no current is flowing in the in circuit 102, a positive voltage will exist across resistor 134 resulting from the voltage division of the five volt supply. The magnitude of this positive voltage is such that the output of the operational amplifier 140 is approximately one volt. When there is spark current 114 flowing in circuit 102, a large positive voltage will exist on the resistor 134. This voltage, applied to the inverting input of the operational amplifier 140 through resistor 136, will drive the output of the operational amplifier to approximately zero volts. However, when there is ion current 120 flowing in circuit 102, it will return to the ion bias capacitor 118 from ground and through the resistor 134. This ion current 120 will generate a negative voltage on resistor 134 which will actually result in a reduced positive voltage across this resistor 134 considering the offset applied by the five volt supply through resistor 132. As the ion current 120 increases in magnitude from zero, the output of the operational amplifier 140 will increase from approximately one volt to approximately five volts in proportion to the magnitude of the ion current 120.

As will now be apparent to those skilled in the art, the self charging ion sensing circuitry 100 reduces overall system cost, complexity, and increases signal integrity of the ion current signal detected at the spark gap 104 of a spark plug. This circuitry 100 eliminates the need for a high voltage power supply external to the ion sensing circuitry 100 and also eliminates the need for a micro-amp current sensing circuit external to the ion sensing coil. The self charging nature of the ion sensing circuit 100 generates its own high voltage bias during the normal sparking event and provides an amplified zero to five volt signal as representative of the ion current flowing at the spark gap 104 of the spark plug. Additionally, the zero to five volt signal indicates spark current and null current conditions separate from the ion current flow conditions provided thereby. As such, the output of the buffer and amplifier circuitry 126 allow for interface to industry standard engine control units (ECUs) and DPF regeneration system controllers.

While the embodiments of FIGS. 1, 2 and 3 illustrate an inductive sparking event, the ion sense current 100 may also operate with capacitive discharge or alternating current spark control circuits. As such, the self charging ion sensing circuitry 100 of the present invention is able to integrate quickly and cost effectively with off the shelf ECUs. This is achieved by eliminating the need for a high voltage power supply and a micro-amp interface circuit. Indeed, these advantages are achieved while providing cathode breakdown and anode ion sensing. The embodiments illustrated in FIGS. 1 and 2 are relatively low cost and reduce the number of wires that need to be connected to the ignition coil relative to prior systems of ion current sensing.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A self charging ion current sensing circuit for use with a spark control circuit for generating sparking current across a spark gap of a spark plug, comprising:
   an ion bias capacitor coupled in series with the spark control circuit, the ion bias capacitor including a Zener diode clamp coupled thereto and parallel therewith to limit a voltage build up on the ion bias capacitor during a sparking event;
   an ion Zener diode having a cathode coupled to the anode of the Zener diode clamp and an anode coupled to ground;
   an offset circuit having an input coupled between the Zener diode clamp and the ion Zener diode, the offset circuitry generating a positive voltage in response to an ion current flow; and
   a buffer and amplifier circuit coupled to the offset circuitry to provide a zero to five volt DC output depending on a type of current flow in the spark control circuit, whereby the output from the buffer and amplifier circuit is approximately one volt when there is no current flowing in the spark control circuit, whereby the output is approximately zero volts when there is cathode spark current flowing in the spark control circuitry, and wherein the output of the buffer and amplifier circuit ranges between approximately one and five volts in proportion to a magnitude of ion current flowing through the spark gap, wherein the output from the buffer and amplifier circuit provides an indication of particular modes of spark plug operation.

2. The circuit of claim 1, further comprising a positive five volt supply circuit coupled to each of the offset circuit and the buffer and amplifier circuit to supply power thereto.

3. The circuit of claim 2, wherein the positive five volt supply circuit comprises a voltage regulation circuit coupled to a supply voltage for the spark control circuit.

4. The circuit of claim 3, wherein the voltage regulation circuit comprises a series connected resistor and Zener diode.

5. The circuit of claim 1, wherein the ion current flow results from a discharge of the ion bias capacitor after being charged during the sparking event by the sparking current flowing in a direction opposite the ion current.

6. The circuit of claim 1, wherein the ion Zener diode provides a high current shunt path from the offset circuit for the sparking current flowing during the sparking event.

7. The circuit of claim 1, wherein the buffer and amplifier circuit comprises an operational amplifier.

8. A self charging ion current sensing circuit for use with a spark control circuit that generates a sparking current across a spark gap of a spark plug, comprising:
   an ion bias capacitor coupled in series with the spark control circuit;

an offset circuit having an input coupled to the ion bias capacitor, the offset circuitry generating a positive voltage in response to an ion current flow; and a buffer and amplifier circuit coupled to the offset circuitry to provide an output that varies depending on a type of current flow in the spark control circuit, whereby the output from the buffer and amplifier circuit has a first predetermined value when there is no current flowing in the spark control circuit, whereby the output has a second predetermined value when there is sparking current flowing in the spark control circuitry, and wherein the output of the buffer and amplifier circuit ranges between the first predetermined value and a third predetermined value in proportion to a magnitude of ion current flowing through the spark gap, wherein the first, second, and third predetermined values of the output from the buffer and amplifier circuit each provide indication of a different mode of spark plug operation.

9. The circuit of claim 8, further comprising a Zener diode clamp coupled to the ion bias capacitor and parallel therewith to limit a voltage build up on the ion bias capacitor during a sparking event.

10. The circuit of clamp 9, further comprising an ion Zener diode having a cathode coupled to an anode of the Zener diode clamp and an anode coupled to ground.

11. The circuit of claim 8, wherein the first predetermined value is approximately one volt.

12. The circuit of claim 8, wherein the second predetermined value is approximately zero volts.

13. The circuit of claim 8, wherein the third predetermined value is approximately five volts.

14. The circuit of claim 8, further comprising a positive five volt supply circuit coupled to each of the offset circuit and the buffer and amplifier circuit to supply power thereto.

15. The circuit of claim 14, wherein the positive five volt supply circuit comprises a voltage regulation circuit coupled to a supply voltage for the spark control circuit.

16. The circuit of claim 15, wherein the voltage regulation circuit comprises a series connected resistor and Zener diode, the Zener diode clamping voltage being approximately equal to the third predetermined value.

17. The circuit of claim 8, wherein the first predetermined value is greater than the second predetermined value, and less than the third predetermined value.

18. A method of sensing ion current within a combustion chamber, comprising the steps of:

providing a spark control circuit that generates a sparking current across a spark gap of a spark plug during a sparking event to initiate combustion;

charging an ion bias capacitor coupled in series with the spark control circuit during the sparking event;

coupling an input of an offset circuit to the ion bias capacitor, the offset circuitry generating a positive voltage in response to an ion current flow during combustion;

coupling a buffer and amplifier circuit to the offset circuitry to provide an output that varies depending on a type of current flow in the spark control circuit;

determining that there is no current flowing in the spark control circuit when the output from the buffer and amplifier circuit has a first predetermined value;

determining that there is sparking current flowing in the spark control circuitry when the output has a second predetermined; and determining that there is ion current flowing when the output of the buffer and amplifier circuit ranges between the first predetermined value and a third predetermined value in proportion to a magnitude of ion current flowing through the spark gap.

19. The method of claim 18, further comprising the step of powering the offset circuit and the buffer and amplifier circuit to a positive five volt supply.

20. The method of claim 18, further comprising the step of limiting a voltage build up on the ion bias capacitor during a sparking event by coupling a Zener diode clamp to and parallel with the ion bias capacitor.

21. The method of claim 20, further comprising the step of providing a high current shunt path from the offset circuit for the sparking current flowing during the sparking event by coupling a cathode of an ion Zener diode to an anode of the Zener diode clamp and by coupling an anode of the ion Zener diode to ground.

22. The method of claim 21, wherein the first predetermined value is greater than the second predetermined value, and less than the third predetermined value.

* * * * *